(12) United States Patent
Cromer et al.

(10) Patent No.: US 7,464,406 B2
(45) Date of Patent: Dec. 9, 2008

(54) SYSTEM AND METHOD FOR USER DETERMINATION OF SECURE SOFTWARE

(75) Inventors: Daryl Carvis Cromer, Apex, NC (US); Howard Jeffrey Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1013 days.

(21) Appl. No.: 10/830,378

(22) Filed: Apr. 22, 2004

(65) Prior Publication Data

US 2005/0240998 A1 Oct. 27, 2005

(51) Int. Cl.
*G06F 7/04* (2006.01)
*H04L 9/00* (2006.01)

(52) U.S. Cl. .................. 726/21; 726/20; 713/150
(58) Field of Classification Search ................ None
See application file for complete search history.

(56) References Cited

U.S. PATENT DOCUMENTS

| | | | | |
|---|---|---|---|---|
| 5,288,978 | A | 2/1994 | Iijima | 235/380 |
| 6,189,098 | B1 | 2/2001 | Kaliski, Jr. | 713/168 |
| 6,609,199 | B1 * | 8/2003 | DeTreville | 713/172 |
| 2001/0037452 | A1 * | 11/2001 | Go et al. | 713/168 |
| 2002/0120575 | A1 * | 8/2002 | Pearson et al. | 705/51 |
| 2002/0194496 | A1 * | 12/2002 | Griffin et al. | 713/200 |
| 2003/0226031 | A1 * | 12/2003 | Proudler et al. | 713/200 |
| 2004/0143730 | A1 * | 7/2004 | Wen et al. | 713/150 |
| 2005/0138370 | A1 * | 6/2005 | Goud et al. | 713/164 |

OTHER PUBLICATIONS

*The Road to Security*, Microsoft, printed Dec. 18, 2003, hhttp://www.microsoft.com/resources/ngsch/default.mspx.
Norlin, Sprague, Biddle, *Trusted Computing: Foundation of Identity*Digital ID World, Oct. 2003, http://www.unclever.com/wavx/DigitalID2003SKSBiddle.html.
Borselius, Niklas, *Multi-agent system security for mobile communication*, PhD Thesis University of London, 2003, http://www.ma.rhul.ac.uk/techreports/2003/RHUL-MA-20003-5.pdf.
*The Security Application Review*, 2003, http://www.wave.com/technology/st_SAR%2002_03_RZ.pdf.

* cited by examiner

*Primary Examiner*—KimYen Vu
*Assistant Examiner*—Ponnoreay Pich
(74) *Attorney, Agent, or Firm*—Rogitz & Associates; Carlos Munoz-Bustamante

(57) ABSTRACT

A secure computer system includes a central processing unit in which plural programs reside. The system includes means for verifying whether the at least one program is trusted or not trusted. That means can be an external key device that includes a verification program that can communicate with the programs residing within the central processing unit.

6 Claims, 4 Drawing Sheets

SYSTEM AND METHOD FOR USER DETERMINATION OF SECURE SOFTWARE

FIELD OF THE INVENTION

The present invention relates generally to computer security.

BACKGROUND OF THE INVENTION

Computers have become deeply entrenched in most businesses worldwide, and many computers are used to process and store vital, propriety information. With the ever-increasing value of such information, computers have become major targets for such nefarious activity as industrial espionage. Programs have been developed that can enter a computer through an Internet connection. These programs can emulate existing programs on a targeted computer in order to gather key information from the targeted computer as a user inputs and manipulates vital information on the targeted computer. The information that has been gathered can then be transmitted from the targeted computer to an outside user or computer. A new security technology, Next-Generation Secure Computing Base (NGSCB), has been provided and employs a unique hardware and software design that enhances data protection, privacy, and system integrity. This security technology can transform a personal computer (PC) into a platform that can perform trusted operations spanning multiple computers under a trust policy that can be dynamically created and whose integrity anyone can authenticate. With the NGSCB, users have the ability for trusted secure computing. Unfortunately, there does not exist any way for determining if a trusted program is truly trusted. In other words, if a rogue program has entered the computer, as described above, a user would not have the ability for discerning between the rogue program and the program that it is emulating.

The present invention has recognized these prior art drawbacks, and has provided the below-disclosed solutions to one or more of the prior art deficiencies.

SUMMARY OF THE INVENTION

A secure mobile or desktop computer system includes a CPU and at least one program residing within the CPU. A portable, preferably wireless device is configured for communicating with the program to verify whether the program is trusted.

The preferred wireless device may include means for indicating whether the at least one program is trusted or not trusted. It may also include a verification program for communicating with the program. The verification program can generate a random identifier, encrypt the identifier, and send the identifier to the program within the CPU. When the program is trusted, it is able to properly return the identifier to the portable device, which can indicate to the user that the program is trusted.

In another aspect, a portable device is disclosed for alerting a user to whether a program in a computer is trusted. The logic of the portable device includes transmitting a test signal that is usable by a trusted platform module in the computer to generate a response, and based on the response, generating a signal indicating whether the program is trusted.

In still another aspect, a method is disclosed for determining whether a computer program residing in a central processing unit is secure. The method includes providing an external key device, with the external key device including verification logic for verifying whether or not a computer program is trusted or not trusted. The method further includes establishing a connection between the external key device and the computer program, and communicating directly with the computer program to determine whether or not the computer program is trusted or not trusted.

In yet another aspect, a portable device for alerting a user to whether at least one program in a computer is trusted includes means for wirelessly transmitting a test signal usable by a trusted platform module in the computer to generate a response, means for receiving back a response, and means for generating, based on the response, a signal indicating whether the program is trusted.

DETAILED DESCRIPTION OF THE PREFERRED EMBODIMENT

Figure 1:
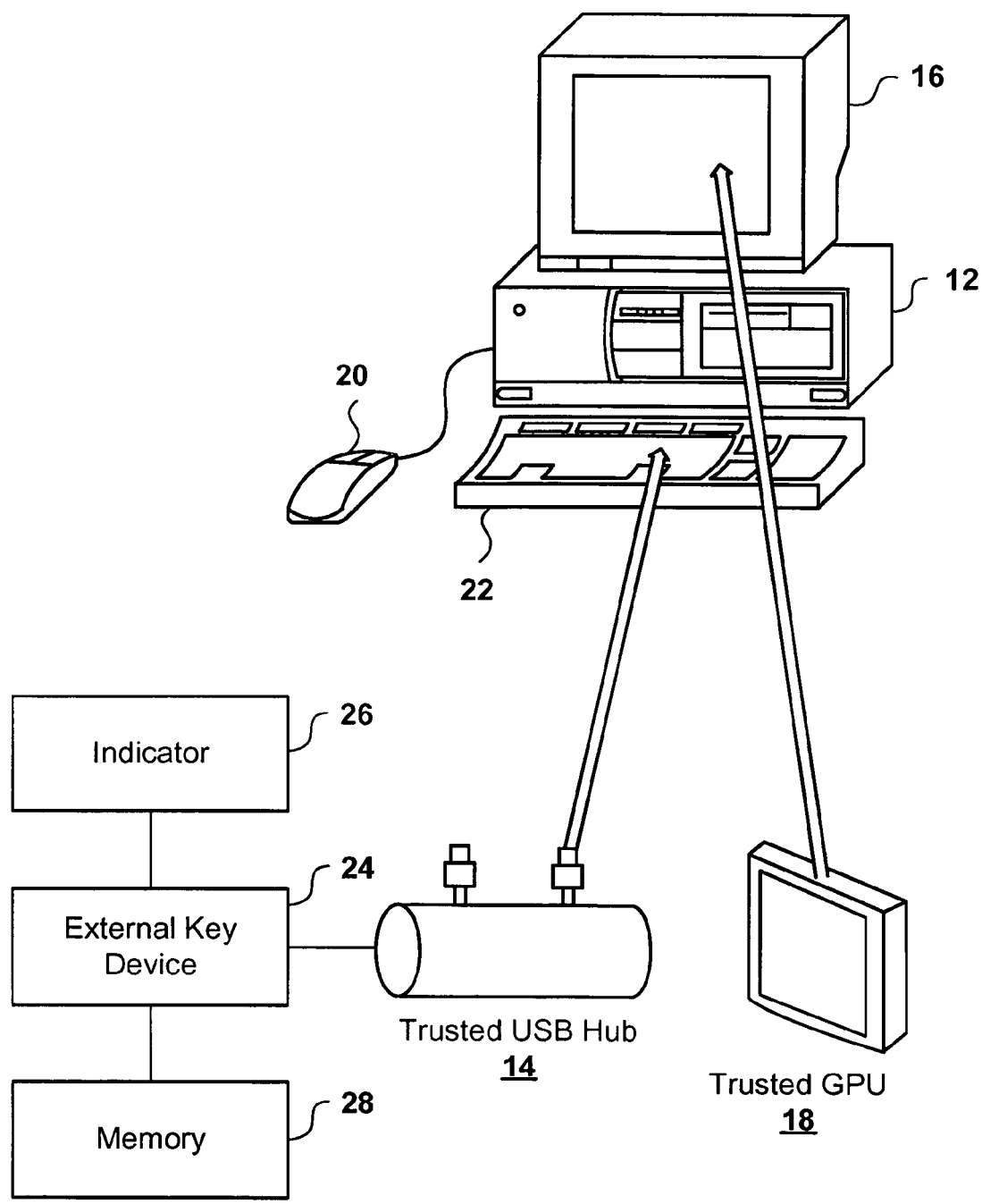
FIG. 1 is a diagram of a computer system.

Referring initially to FIG. 1, a computer system is shown and is generally designated 10. The computer system 10 can be, e.g., a desktop computer system, mobile computer system, or other computer system.

FIG. 1 shows that the system 10 includes a central processing unit (CPU) 12 that, preferably, can include a trusted universal serial bus (USB) hub 14 and a monitor 16. As shown in FIG. 1, the monitor 16 can provide graphics display via a trusted graphics processing unit (GPU) 18. FIG. 1 also shows a mouse 20 and a keyboard 22 that can be connected via the trusted USB hub 14. Preferably, input from the mouse 20 and the keyboard 22 can be secured by the trusted USB hub 14, which communicates with a trusted portion of an execution environment, described below, within the CPU 12. Conversely, output is secured by the trusted GPU 18, which can also communicate with the trusted portion of the execution environment within the CPU 12. In each case, the communication with the trusted portion of the execution environment can be crypto-protected. This yields "fingertip-to-eyeball" security.

As further shown in FIG. 1, an external key device 24 can be connected to the trusted USB hub 14 and used, as described in detail below, to verify the authenticity of a trusted software program operating within the CPU 12. As stated above the external key device 24 can be a USB device, but it is to be understood that it may be a wireless device, e.g., a wireless Bluetooth device, an 802.11 device, etc. As described in detail below, the external key device 24 works in conjunction with one or more internal cryptographic keys that can only be accessed when a secure software module, also referred to herein as a nexus, is running. The external key device 24 and the internal cryptographic key establish a trusted key that has the ability to communicate with a program to determine if that program is trusted, i.e., secure.

FIG. 1 shows that the external key device 24 can include an indicator 26 that can be used to indicate to a user that a particular program is trusted and not only that, but also operating in a trusted mode. It can be appreciated that the indicator 26 can be a visual indicator, e.g., a light emitting diode (LED), or an audio indicator, e.g., an annunciator, or an alpha-numeric display. Moreover, the external key device 24 can include a memory 28 in which the logic steps described below in conjunction with FIG. 3 and FIG. 4 can be stored.

Figure 2:
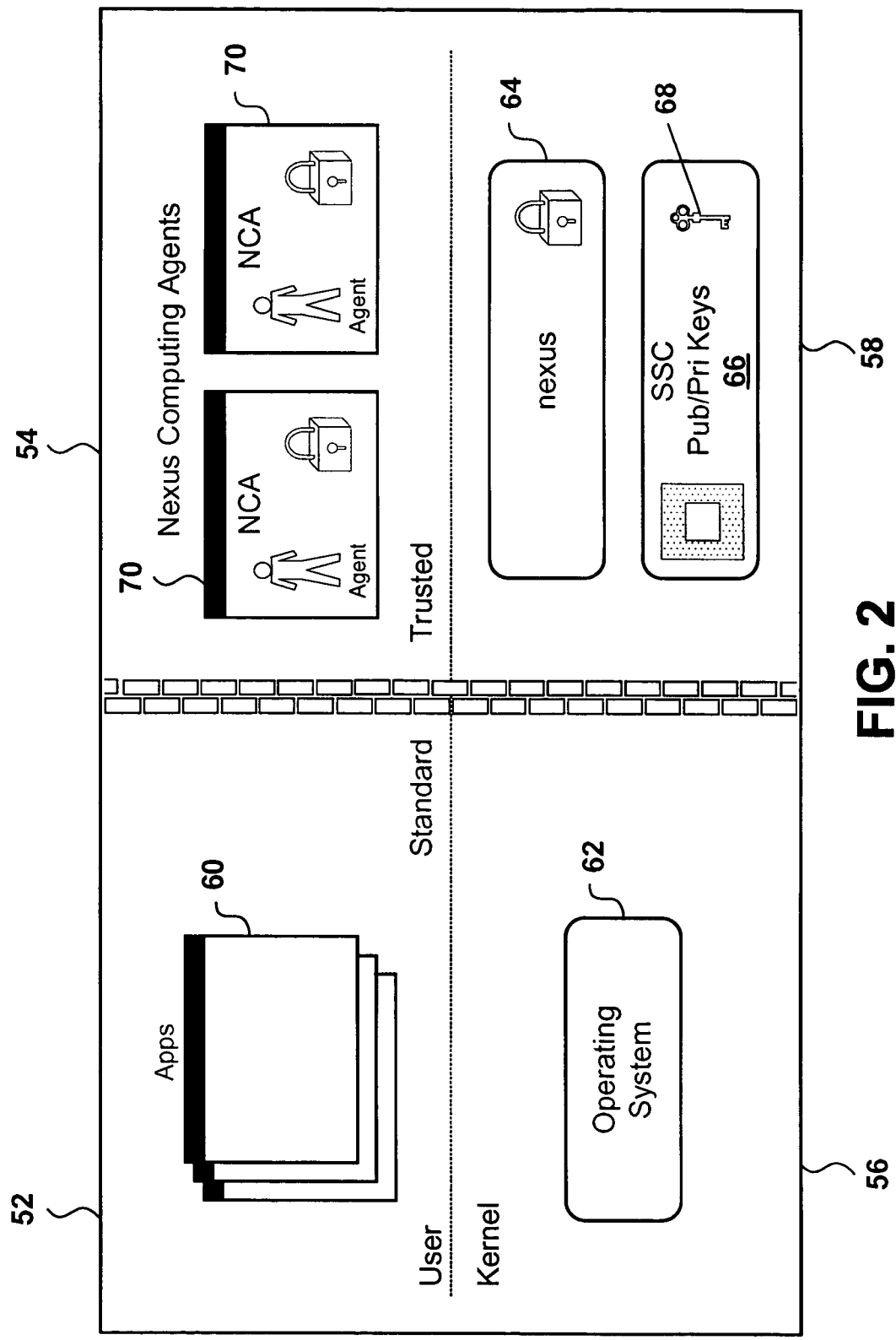
FIG. 2 is a diagram of an execution environment within the computer system shown in FIG. 1.

FIG. 2 shows an execution environment, generally designated 50, that can be located within the CPU 12. As shown, the execution environment 50 can be subdivided such that it includes a standard user portion 52, a trusted user portion 54, a standard kernel portion 56, and a trusted kernel portion 58. Typically, plural non-trusted user applications 60 reside in the standard user portion 52 of the execution environment. Moreover, an operating system 62 typically resides in the standard kernel portion 56 of the execution environment. In general, the operating system 62 controls the operation of the CPU 12, and it may not be aware or have knowledge that the trusted part or parts exist.

As shown in FIG. 2, the trusted kernel portion 58 of the execution environment 50 includes an operating system module referred to herein as a nexus 64. The nexus 64 preferably is a software module that can enable secure interaction with applications, peripheral hardware, memory, and storage. Also, within the trusted kernel portion 58 of the execution environment is a security support component (SSC) 66. The preferred SSC 66 is a hardware module that can perform certain cryptographic operations and that can securely store internal cryptographic keys 68 that are used by the external key device 24, the nexus 64, and the nexus computing agents (NCAs), described below, to provide sealed storage and attestation functions. The preferred SSC 66 can provide RSA public-key operations (e.g., encryption, decryption, digital signature generation, and verification), Advanced Encryption Standard (AES) encryption and decryption, and Secure Hash Algorithm 1 (SHA-1) hash computation. The SSC 66 can also contain at least one RSA private key and an AES symmetric key, both of which are private to the SSC 66 and are never exported from the chip.

In a preferred embodiment, the nexus 64 can offer several security features. For example, users can wall off and hide pages of main memory so that any nexus-aware application within the execution environment 50 can be assured that it is not modified or observed by any other application or even the operating system 62. Additionally, information can be stored such that only the application from which data is saved (or a trusted designated application or entity) can open it. With this sealed storage, a nexus-aware application or module can mandate that the information is accessible to only itself or to a set of other trusted components that can be identified in a cryptographically secure manner. Also, with the "fingertip-to-eyeball" security, secure channels are established via the nexus and the trusted USB hub 14 and allow data to move safely from the keyboard 22 or mouse 20 to nexus-aware applications. Data can also move via the secure channels from any nexus-aware applications to a region of the monitor 16. Using the nexus 64, users can also have the ability to authenticate software or a combination of software and hardware. It is to be appreciated that the CPU 12 (FIG. 1) can operate in a standard mode without any of the above-mentioned security features or in a trusted mode including these security features.

FIG. 2 further shows plural nexus computing agents (NCAs) 70 that can reside within the trusted user portion 54 of the execution environment 50. It is to be understood that the NCAs 70 are trusted software components that utilize protected information. Preferably, the NCAs 70 can facilitate user input of protected information to protected memory within the trusted kernel portion 58 of the execution environment 50. Moreover, the NCAs 70 can facilitate the display of protected information to a user.

In the system 10 described above, the logic of the present invention can be contained on a data storage device with a computer readable medium, e.g., the memory 28 within the external key device 24, thereby establishing a computer program product, i.e., an article of manufacture according to the invention. In an illustrative embodiment of the invention, the computer-executable instructions may be lines of C++ compatible code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus to perform a sequence of function steps corresponding to those shown.

Figure 3:
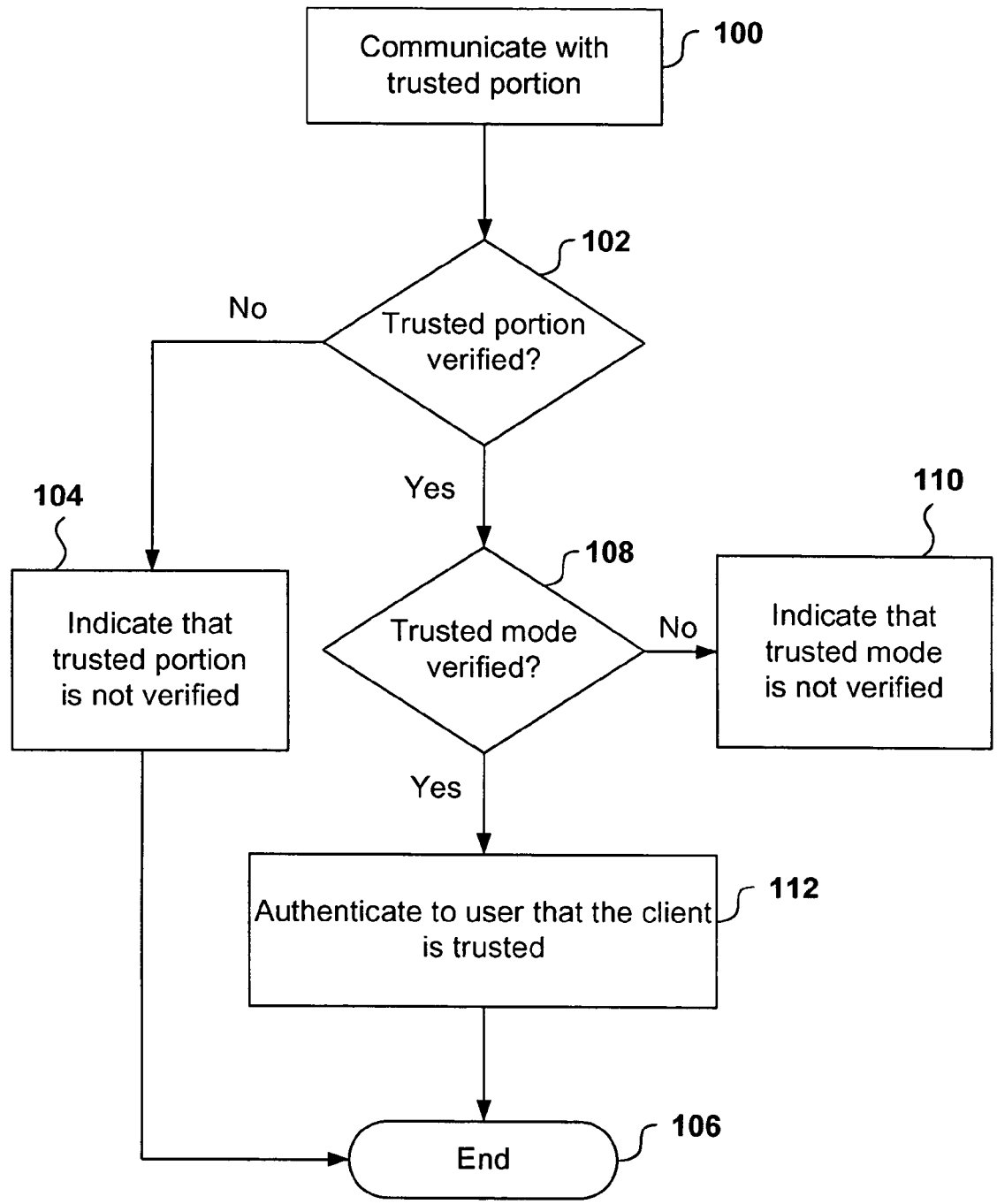
FIG. 3 is a flow chart of the general operating logic.

Referring now to FIG. 3, the general operating logic is shown and commences at block 100 wherein the external key device 24 communicates with the trusted portion of the execution environment 50, e.g., an NCA 70 (FIG. 2) within the trusted user portion 54 (FIG. 2) of the execution environment 50 (FIG. 2). At decision diamond 102, it is determined whether the trusted portion is verified, i.e., if the NCA 70 (FIG. 2) is actually operating in the trusted portion of the execution environment (FIG. 2). If not, the logic proceeds to block 104 where it is indicated that trusted portion is not verified. The logic then ends at state 106. If, at decision diamond 102, it is determined that the trusted portion is verified, the logic continues to decision diamond 108.

At decision diamond 108, it is determined whether the trusted mode is verified, i.e., whether the NCA 70 (FIG. 2) is operating in a trusted mode. If not, the logic moves to block 110 and it is indicated that the trusted mode is not verified. The logic then ends at state 106. Returning to decision diamond 108, if the trusted mode is verified, the logic moves to block 112, wherein it is indicated to the user that the NCA 70 (FIG. 2) is trusted and operating in trusted mode. The logic then ends at state 106.

Figure 4:
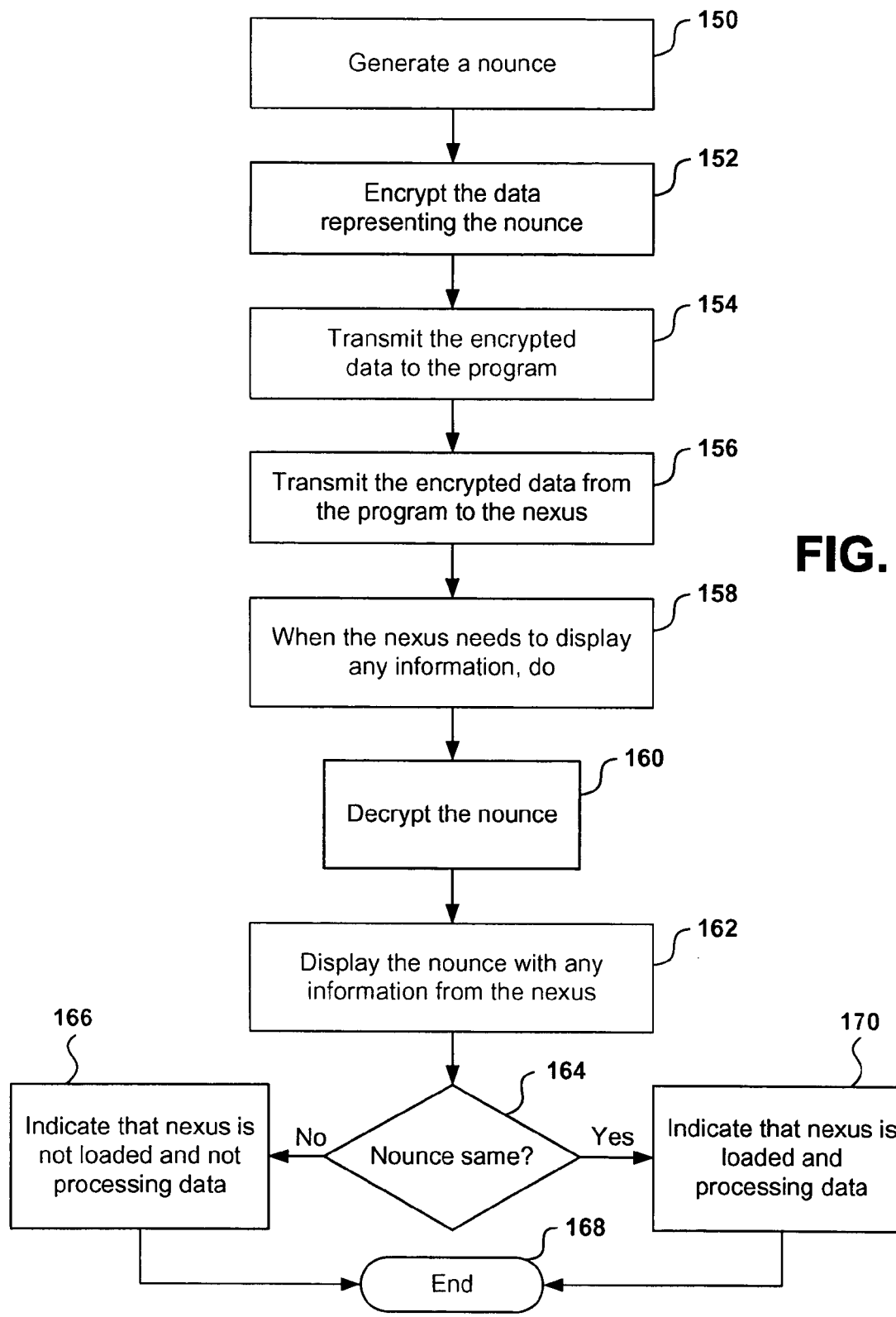
FIG. 4 is a flow chart of the verification logic.

FIG. 4 shows a non-limiting example of the verification logic that can be used by the system to determine whether a particular NCA 70 (FIG. 2) is trusted or not. Commencing at block 150, a one-time random identifier such as a nonce is generated. At block 152, the data representing the nonce is encrypted. Proceeding to block 154, the encrypted data is transmitted to the NCA 70 (FIG. 2). Thereafter, at block 156, the encrypted data is transmitted from the NCA 70 (FIG. 2) to the nexus 64 (FIG. 2).

Continuing to block 158, a do loop is entered wherein when the nexus 64 (FIG. 2) needs to display information at the monitor 16 (FIG. 1), the following steps are performed. At block 160, the data representing the nonce is decrypted. Moving to block 163, the nonce is displayed with any information from the nexus 64 (FIG. 2). Next, at decision diamond 164 it is determined whether the nonce returned from the nexus 64 (FIG. 2) is the same as the nonce that was initially sent to the NCA 70 (FIG. 2) in question.

One non-limiting way to make this determination is to display the returned nonce on the display of the device that transmitted the original nonce. The user can then look at the nonce to validate it by visually comparing the nonce to the original nonce as might be displayed on the indicator 26. Or, the nonce can be encrypted and then returned to the device that originally sent it, with the device then decrypting the nonce and comparing the decrypted version with the value of the original nonce, to determine if they match.

If the returned nonce is not the same as the one that was originally sent, the logic proceeds to block 166 where it is indicated that the nexus (FIG. 2) is not loaded and is not processing data from the NCA 70 (FIG. 2). An alert may be generated if desired. The logic then ends at state 168. On the other hand, if the returned nonce matches the original nonce, the logic moves to block 170 where it is indicated that the nexus (FIG. 2) is loaded and processing data from the NCA 70 (FIG. 2). Thus, the user knows that he or she is utilizing a secure program. The logic then ends at state 168.

With the configuration of structure described above, the present invention can identify truly trusted programs and prevent rogue programs, which may have entered the CPU 12 (FIG. 1) via an Internet connection, from emulating existing trusted programs residing within the trusted portion of the execution environment 50 (FIG. 2). Thus, the present invention can prevent any rogue programs from stealing protected information from an unsuspecting user and transmitting that protected information away from the computer via the Internet.

While the particular SYSTEM AND METHOD FOR USER DETERMINATION OF SECURE SOFTWARE as herein shown and described in detail is fully capable of attaining the above-described aspects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A secure computer system, comprising:
    a central processing unit (CPU);
    at least one program residing within the central processing unit; and
    a portable device configured for communicating with the program to verify whether the program is trusted, the portable device first determining whether the program is operating in a trusted portion of the CPU, and if not, indicating not verified, otherwise determining whether the program is operating in a trusted mode, and if not, indicating not verified, otherwise indicating verified.

2. The system of claim 1, wherein the device is wireless and includes means for indicating whether the at least one program is trusted or not trusted.

3. The system of claim 1, wherein the device is wireless and includes a verification program for communicating with the program.

4. The system of claim 3, wherein the verification program generates a random identifier and sends the random identifier to the program within the CPU.

5. The system of claim 4, wherein the verification program encrypts the random identifier prior to sending it.

6. The system of claim 5, wherein the verification program further comprises logic for:
    when the at least one program is trusted, receiving the random identifier from the at least one program.

* * * * *